(12) United States Patent
Kazuno

(10) Patent No.: US 10,431,836 B2
(45) Date of Patent: Oct. 1, 2019

(54) POWER SUPPLY SYSTEM

(71) Applicant: HONDA MOTOR CO., LTD., Tokyo (JP)

(72) Inventor: Shuichi Kazuno, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 58 days.

(21) Appl. No.: 15/452,740

(22) Filed: Mar. 8, 2017

(65) Prior Publication Data
US 2017/0263961 A1 Sep. 14, 2017

(30) Foreign Application Priority Data
Mar. 9, 2016 (JP) .................. 2016-045673

(51) Int. Cl.
*H01M 8/04858* (2016.01)
*H01M 16/00* (2006.01)
(Continued)

(52) U.S. Cl.
CPC ..... *H01M 8/04932* (2013.01); *H01M 8/0494* (2013.01); *H01M 8/04604* (2013.01); *H01M 8/04619* (2013.01); *H01M 8/04626* (2013.01); *H01M 8/04947* (2013.01); *H01M 8/04992* (2013.01); *H01M 16/006* (2013.01);
(Continued)

(58) Field of Classification Search
CPC ......... H01M 8/04932; H01M 8/04604; H01M 8/04619; H01M 8/04626; H01M 8/0494; H01M 8/04947; H01M 8/04992; H01M 16/006; H01M 2008/1095;
(Continued)

(56) References Cited

U.S. PATENT DOCUMENTS

2001/0024105 A1* 9/2001 Abe .................. B60L 11/1851
320/132
2008/0297113 A1* 12/2008 Saeki ................ H01M 8/0494
320/128
(Continued)

FOREIGN PATENT DOCUMENTS

JP 2001-275205 10/2001
JP 2003-272679 9/2003
(Continued)

OTHER PUBLICATIONS

Japanese Office Action for corresponding JP Application No. 2016-045673, Nov. 7, 2017 (w/ English machine translation).

*Primary Examiner* — Amy Cohen Johnson
(74) *Attorney, Agent, or Firm* — Mori & Ward, LLP

(57) ABSTRACT

A power supply system includes a fuel cell, a power storage, and a processor. The fuel cell and the power storage supply electric power to a load. The processor is configured to control the fuel cell and the power storage. The processor is configured to acquire a required system power that is required in the power supply system. The processor is configured to determine a power storage shared power such that power efficiency of the electric power supplied from the power storage to the load is equal to or higher than a first value. The processor is configured to determine a fuel cell shared power such that the electric power supplied from the fuel cell is a difference between the power storage shared power and the required system power.

8 Claims, 7 Drawing Sheets

(51) Int. Cl.
  *H01M 8/04537* (2016.01)
  *H01M 8/04992* (2016.01)
  *H01M 8/04828* (2016.01)
  *H01M 8/1018* (2016.01)

(52) U.S. Cl.
  CPC .......................... *H01M 2008/1095* (2013.01); *H01M 2220/20* (2013.01); *H01M 2250/20* (2013.01); *H01M 2250/402* (2013.01); *Y02T 90/32* (2013.01)

(58) Field of Classification Search
  CPC ......... H01M 2220/20; H01M 2250/20; H01M 2250/402; Y02T 90/32
  See application file for complete search history.

(56) References Cited

U.S. PATENT DOCUMENTS

| | | | |
|---|---|---|---|
| 2010/0136379 A1* | 6/2010 | King | H01M 8/04619 429/432 |
| 2013/0176759 A1* | 7/2013 | Kaneko | H02M 7/537 363/97 |

FOREIGN PATENT DOCUMENTS

| | | |
|---|---|---|
| JP | 2004-253152 | 9/2004 |
| JP | 2009-259754 | 11/2009 |

* cited by examiner

POWER SUPPLY SYSTEM

CROSS-REFERENCE TO RELATED APPLICATIONS

The present disclosure claims priority under 35 U.S.C. § 119 to Japanese Patent Application No. 2016-045673, filed Mar. 9, 2016, entitled "Power Supply System." The contents of this application are incorporated herein by reference in their entirety.

BACKGROUND

1. Field

The present disclosure relates to a power supply system.

2. Description of the Related Art

Japanese Unexamined Patent Application Publication No. 2003-272679 describes a technique that keeps power generation efficiency of the fuel cell high even when output characteristics of the fuel cell vary (see paragraph [0005], Abstract). To this end, Japanese Unexamined Patent Application Publication No. 2003-272679 (Abstract) states that output power (FC allowable power) of the fuel cell in a fuel cell system 22 is determined based on the amount of supply gas with reference to stored output characteristics. Power that a secondary cell 26 should output is determined as a difference between required power based on the load requirement and the FC allowable power. Here, using a value of voltage fluctuation occurred when the secondary cell 26 outputs the above power as a voltage command of a DC/DC converter 28, a drive converter 30 is driven such that a drive motor 32 consumes power corresponding to the load requirement. As a result, the output power of the fuel cell varies around the FC allowable power. Then, output current and voltage of the fuel cell is measured to newly acquire output characteristics. Thereafter, the FC allowable power of the same gas is determined based on the newly acquired output characteristics.

SUMMARY

According to one aspect of the present invention, a power supply system includes a fuel cell, a power storage, and a processor. The fuel cell and the power storage supply electric power to a load. The processor is configured to control the fuel cell and the power storage. The processor is configured to acquire a required system power that is required in the power supply system. The processor is configured to determine a power storage shared power such that power efficiency of the electric power supplied from the power storage to the load is equal to or higher than a first value. The processor is configured to determine a fuel cell shared power such that the electric power supplied from the fuel cell is a difference between the power storage shared power and the required system power.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
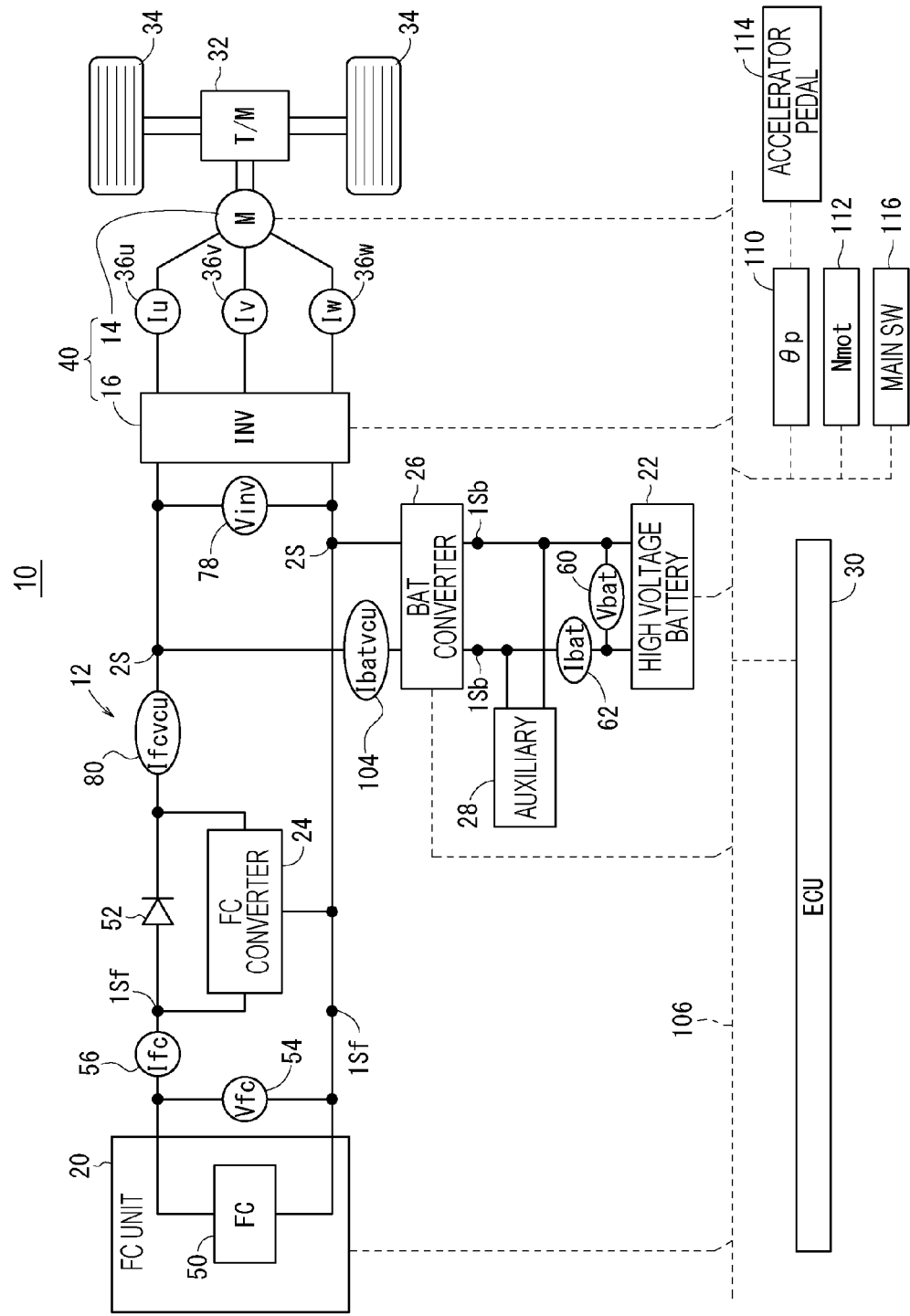
FIG. 1 is a schematic overall configuration view of a fuel cell vehicle in which a fuel cell system as a power supply system according to a first embodiment of the present disclosure is mounted.

The embodiments will now be described with reference to the accompanying drawings, wherein like reference numerals designate corresponding or identical elements throughout the various drawings.

A. First Embodiment

<A-1. Configuration>

[A-1-1. Overall Configuration]

FIG. 1 is a schematic overall configuration view of a fuel cell vehicle 10 (hereinafter referred to as "FC vehicle 10" or "vehicle 10") in which a fuel cell system 12 (hereinafter referred to as "FC system 12" or "system 12") as a power supply system according to a first embodiment of the present disclosure is mounted. The FC vehicle 10 includes a drive motor 14 (hereinafter referred to as "motor 14") and an inverter 16 in addition to the FC system 12.

The FC system 12 includes a fuel cell unit 20 (hereinafter referred to as "FC unit 20"), a high voltage battery 22 (hereinafter also referred to as "battery 22"), a FC converter 24, a battery converter 26, an auxiliary 28, and an electronic control unit 30 (hereinafter referred to as "ECU 30").

[A-1-2. Drive System]

The motor 14 according to the embodiment is of the three phase AC brushless type. The motor 14 is configured to generate a drive force based on a power supplied from the FC unit 20 and the battery 22 and rotate a wheel 34 by the drive force through a transmission 32. The motor 14 is also configured to output a power (regenerative power Preg) "W" generated by regeneration to the battery 22 and so on. Currents of the phases (U phase, V phase, and W phase) of the motor 14 are detected by current sensors 36u, 36v, and 36w. Alternatively, current may be detected from only two phases out of the three phases, and current of the remaining one phase may be detected therefrom.

The inverter 16 has a three phase full bridge configuration and is configured to perform DC-to-AC conversion. More specifically, the inverter 16 is configured to convert DC to three phase AC and supply the AC to the motor 14, and supply DC subjected to AC-to-DC conversion following the regeneration to the battery 22 and so on through the battery converter 26. The motor 14 and the inverter 16 are collectively referred to as a load 40.

[A-1-3. FC Unit 20]

The FC unit 20 includes a fuel-cell stack 50 (hereinafter referred to as "FC stack 50", "fuel cell 50" or "FC 50") and peripheral parts thereof. The FC stack 50 has, for example, a configuration in which fuel cells formed by sandwiching a solid polymer electrolyte membrane between an anode electrode and a cathode electrode from both sides thereof are laminated. The peripheral parts include anode parts for supplying and discharging hydrogen (fuel gas) to the anode of the FC stack 50 and cathode parts for supplying and discharging air including oxygen (oxidizing agent gas) to the cathode of the FC stack 50. As illustrated in FIG. 1, a reverse-flow-prevention diode 52 is disposed in parallel with the FC converter 24 between the FC unit 20 (FC 50) and the inverter 16.

Output voltage of the FC 50 (hereinafter referred to as "FC voltage Vfc") is detected by a voltage sensor 54. Output current of the FC 50 (hereinafter referred to as "FC current Ifc") is detected by a current sensor 56.

The upper limit value of the voltage range which the FC 50 according to the first embodiment can output is set to a value lower than the lower limit value of the range of the required voltage Vmot_req (hereinafter referred to as "required motor voltage Vmot_req") of the motor 14. Alternatively, the upper limit value of the voltage range which the FC 50 can output may be set to a value higher than the lower limit value of the range of the required motor voltage Vmot_req and lower than the upper limit value thereof.

[A-1-4. High Voltage Battery 22]

The battery 22 (storage device) is a storage device (energy storage) including multiple battery cells, for which, for example, a lithium ion secondary battery, a nickel hydrogen secondary battery, and so on may be used. A storage device such as the capacitor may be used in place of the battery 22. Input/output voltage of the battery 22 (hereinafter referred to as "battery voltage Vbat" or "BAT voltage Vbat") [V] is detected by a voltage sensor 60. Input/output current of the battery 22 (hereinafter referred to as "battery current Ibat" or "BAT current Ibat") [A] is detected by a current sensor 62. The ECU 30 calculates the remaining capacity (SOC) [%] of the battery 22 based on the battery voltage Vbat and the battery current Ibat.

The upper limit value of the voltage range which the battery 22 according to the first embodiment can output is set to a value lower than the lower limit value of the range of the required motor voltage Vmot_req. Alternatively, the upper limit value of the voltage range which the battery 22 can output may be set to a value higher than the lower limit value of the range of the required motor voltage Vmot_req and lower than the upper limit value thereof.

[A-1-5. FC Converter 24]

The FC converter 24 (first voltage converter) is a step-up chopper type voltage converter (DC/DC converter) configured to boost output voltage of the FC 50 (FC voltage Vfc) to the inverter 16. The FC converter 24 is disposed between the FC 50 and the inverter 16. In other words, the FC converter 24 is connected, at one side thereof, to a primary side 1Sf where the FC 50 is located, and at another side thereof, to a secondary side 2S where the battery 22 and the load 40 are connected therewith. Hereinafter, the FC converter 24 is referred to as a converter 24, a step-up converter 24, or a FC-VCU 24. The FC-VCU 24 means a voltage control unit for the FC 50.

Figure 2:
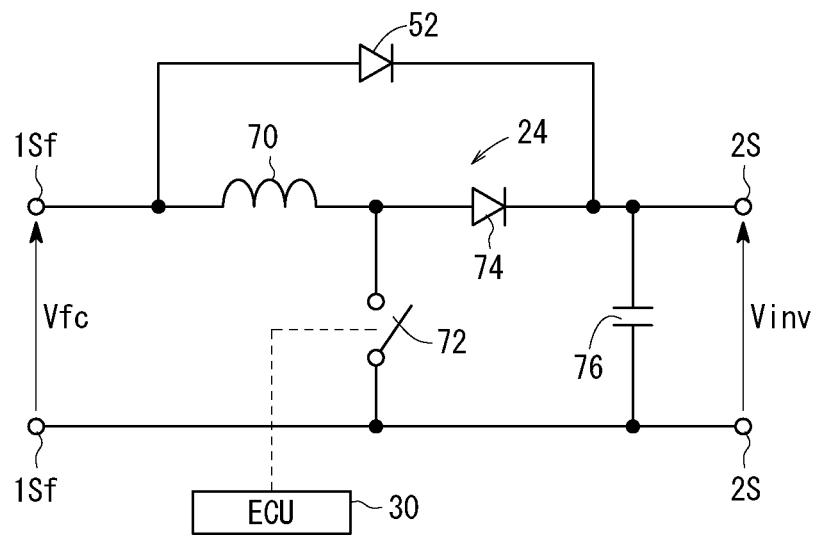
FIG. 2 is a schematic circuit diagram illustrating a configuration example of a FC converter according to the first embodiment.

FIG. 2 is a schematic circuit diagram illustrating a configuration example of the FC converter 24 according to the first embodiment. The FC-VCU 24 includes an inductor 70, a switching element 72, a diode 74, and a smoothing capacitor 76. The FC-VCU 24 boosts the FC voltage Vfc when the switching element 72 is switched (duty control) through the ECU 30. The boosted voltage turns input terminal voltage of the inverter 16 (hereinafter referred to as "inverter input terminal voltage Vinv" or "input terminal voltage Vinv"). The inverter input terminal voltage Vinv is detected by a voltage sensor 78 (FIG. 1). Output terminal current of the FC-VCU 24 (hereinafter referred to as "output terminal current Ifcvcu") is detected by a current sensor 80.

The switching element 72 (first switching element) according to the first embodiment includes, for example, an insulated gate bipolar transistor (IGBT). The IGBT constituting the switching element 72 is, for example, made of silicon.

When the switching element 72 is kept in the off state (open state), current from the FC 50 (hereinafter referred to as "FC power Pfc") may be supplied through a wiring having the diode 52 or a wiring having the inductor 70 and the diode 74, without boosting. Hereinafter, state where the FC power Pfc is supplied without boosting is referred to as "directly coupled state", and operation for achieving the directly coupled state is referred to as "directly coupling operation".

In the directly coupled state, boosting by the FC-VCU 24 is not performed. Therefore, the inverter input terminal voltage Vinv is equal to the FC voltage Vfc. More specifically, in the directly coupled state, the input terminal voltage Vinv is a value obtained by subtracting a voltage drop by diodes 52, 74 from the FC voltage Vfc. Hereinafter, description is made on the basis that the input terminal voltage Vinv is substantially equal to the FC voltage Vfc.

The FC-VCU 24 is directly coupled, for example, when the battery SOC is lower than the first SOC threshold THsoc1 and power is supplied to the motor 14 only from the FC 50. Alternatively, the FC-VCU 24 is directly coupled when the required motor voltage Vmot_req is lower than the FC voltage Vfc and boosting by the FC-VCU 24 is not required. Alternatively, the FC-VCU 24 may be directly coupled when output of large current from the FC 50 is required (during sudden acceleration of the vehicle 10 or the like). More specifically, in the current-voltage characteristics of the FC 50, lower the FC voltage Vfc, higher the FC current Ifc flows. Thus, the FC-VCU 24 may be put in the directly coupled state to output a relatively large FC current Ifc by directly coupling the FC-VCU 24 in the state where the boosting rate of the BAT-VCU 26 is held low. Alternatively, the FC-VCU 24 may be directly coupled during regeneration of the motor 14.

The diode 74 works for the direct coupling and the reverse flow prevention like the diode 52. Thus, the diode 52 may be omitted.

[A-1-6. Battery Converter 26]

The battery converter 26 (second voltage converter) is a step-up chopper type voltage converter (DC/DC converter). More specifically, the battery converter 26 supplies output voltage of the battery 22 (battery voltage Vbat) to the inverter 16 by boosting or in the directly coupled state. The battery converter 26 supplies regenerative voltage (hereinafter referred to as "regenerative voltage Vreg) of the motor 14 or the inverter input terminal voltage Vinv as the FC voltage Vfc to the battery 22 in the directly coupled state.

As illustrated in FIG. 1, the battery converter 26 is disposed between the battery 22 and the inverter 16. In other words, the battery converter 26 is connected, at one side thereof, to a primary side 1Sb where the battery 22 is located, and at another side thereof, to a secondary side 2S where the FC 50 and the load 40 are connected thereto.

Hereinafter, the battery converter 26 is referred to as a converter 26, a BAT converter 26, a step-up converter 26, or a BAT-VCU 26. The BAT-VCU 26 means a voltage control unit for the battery 22.

Figure 3:
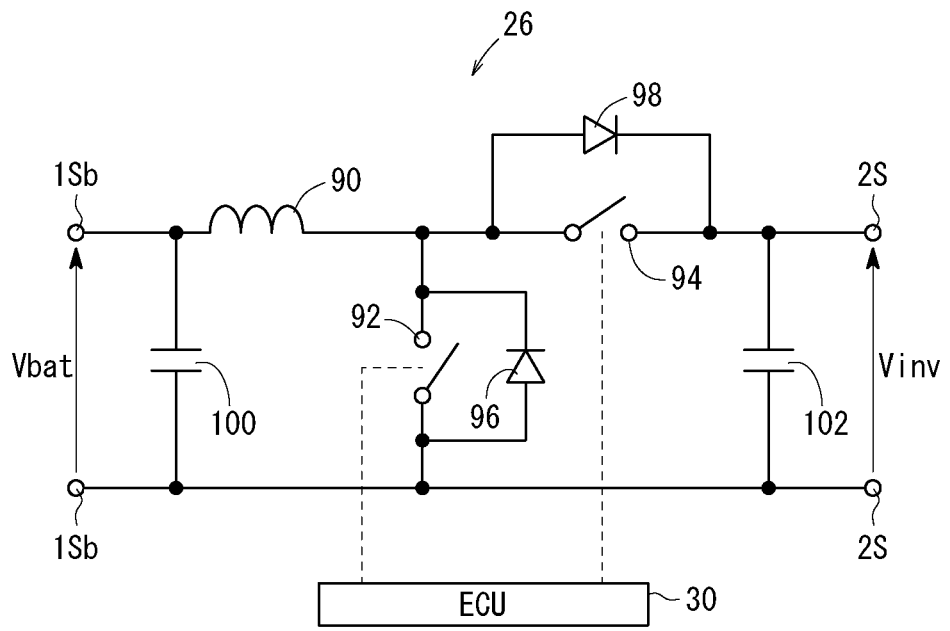
FIG. 3 is a schematic circuit diagram illustrating a configuration example of a battery converter according to the first embodiment.

FIG. 3 is a schematic circuit diagram illustrating a configuration example of the battery converter 26 in the first embodiment. The BAT-VCU 26 includes an inductor 90, switching elements 92, 94, diodes 96, 98 respectively coupled to the switching elements 92, 94 in parallel and smoothing capacitors 100, 102.

The switching elements 92, 94 (second switching elements) of the first embodiment include, for example, the same IGBT as the switching element 72. Alternatively, the switching elements 92, 94 may include a switching element of a type different from the switching element 72.

During boosting (during powering time using the battery 22), the switching element 94 is turned off and the switching element 92 is turned on by the ECU 30 (duty control) to boost the battery voltage Vbat. The boosted voltage turns the inverter input terminal voltage Vinv.

During regeneration, the switching element 92 is turned off and the switching element 94 is turned on by the ECU 30 to supply the inverter input terminal voltage Vinv to the battery 22 as is. In other words, the battery voltage Vbat (input voltage to the battery 22) turns the inverter input terminal voltage Vinv.

As described above, the inverter input terminal voltage Vinv is detected by the voltage sensor 78 (FIG. 1). Output terminal current of the BAT-VCU 26 (hereinafter referred to as "output terminal current Ibatvcu") is detected by a current sensor 104.

In the BAT-VCU 26, the same directly coupled state as the FC-VCU 24 also may be achieved, and the BAT-VCU 26 may perform direct coupling operation or direct coupling.

In this embodiment, the FC-VCU 24 and the BAT-VCU 26 are controlled by the ECU 30 to control supply destination of the FC power Pfc from the FC unit 20, power supplied from the battery 22 (hereinafter referred to as "battery power Pbat" or "BAT power Pbat") [W] and regenerative power Preg from the motor 14.

[A-1-7. Auxiliary 28]

The auxiliary 28 may include, for example, at least one of the air pump, water pump, air conditioner, step-down type DC-DC converter, low voltage battery, accessory, radiator fan and ECU 30.

The air pump supplies air to the FC 50. The water pump circulates water as a refrigerant to cool down the FC 50. The air conditioner regulates temperature and so on in the vehicle 10. The step-down type DC-DC converter steps down voltage on the primary side 1Sb of the step-up converter 26 (BAT-VCU 26) and supplies to the low voltage battery, the accessory, the radiator fan, and the ECU 30. The low voltage battery is a battery (for example, 12V battery) for activating low voltage apparatuses. The accessory includes apparatuses such as the audio device and navigation device. The radiator fan is a fan for cooling down a refrigerant circulated by the water pump in the radiator.

The air pump, the water pump and the radiator fan out of the auxiliary 28 are also included in the FC unit 20.

[A-1-8. ECU 30]

The ECU 30 controls the motor 14, inverter 16, FC unit 20, battery 22, converters 24, 26 and auxiliary 28 via a communication line 106 (FIG. 1). To perform the control, the ECU 30 executes a program stored in a storage unit (not shown). The ECU 30 uses values detected by various sensors such as voltage sensors 54, 60, 78 and current sensors 36u, 36v, 36w, 56, 62, 80, 104.

The various sensors include an opening degree sensor 110 and a motor revolution sensor 112 (FIG. 1) in addition to the above-mentioned sensors. The opening degree sensor 110 detects the opening degree Op (hereinafter also referred to as "accelerator pedal opening degree Op") [degree] of an accelerator pedal 114. The motor revolution sensor 112 detects the revolution [rpm] of the motor 14 (hereinafter referred to as "motor revolution Nmot" or "revolution Nmot"). The ECU 30 detects vehicle speed V [km/h] of the FC vehicle 10 by using the revolution Nmot. Further, the ECU 30 connects with a main switch 116 (hereinafter referred to as "main SW 116"). The main SW 116 is configured to select whether to supply power from the FC unit 20 and the battery 22 to the motor 14, and may be operated by the user.

The ECU 30 includes a microcomputer, and, if necessary, includes an I/O interface such as the A/D converter and the D/A converter. The ECU 30 may be constituted by not only one ECU but also multiple ECUs for the motor 14, FC unit 20, battery 22, step-up converters 24, 26 and auxiliary 28.

The ECU 30 determines a load Psys (hereinafter referred to as "system load Psys") required to the FC system 12 for the entire FC vehicle 10 based on the state of the FC stack 50, the state of battery 22 and the state of the motor 14 plus inputs (load requirements) from various switches and various sensors. Then, the ECU 30 adjusts and determines allocation (share) of a load which the FC stack 50 should share, a load which the battery 22 should share, and a load which the regeneration power supply (motor 14) should share. Further, the ECU 30 sends commands to the motor 14, inverter 16, FC unit 20, battery 22, and converters 24, 26. As basic controls of the ECU 30, for example, controls disclosed by Japanese Unexamined Patent Application Publication No. 2003-272679 or Japanese Unexamined Patent Application Publication Nos. 2014-166103 may be used.

<A-2. Control of First Embodiment>

Next, a system power control which controls output of the FC 50 and battery 22 in the first embodiment is described. For other controls, those disclosed by Japanese Unexamined Patent Application Publication No. 2003-272679 or Japanese Unexamined Patent Application Publication Nos. 2014-166103 may be used.

[A-2-1. Overall Flow of System Power Control]

Figure 4:
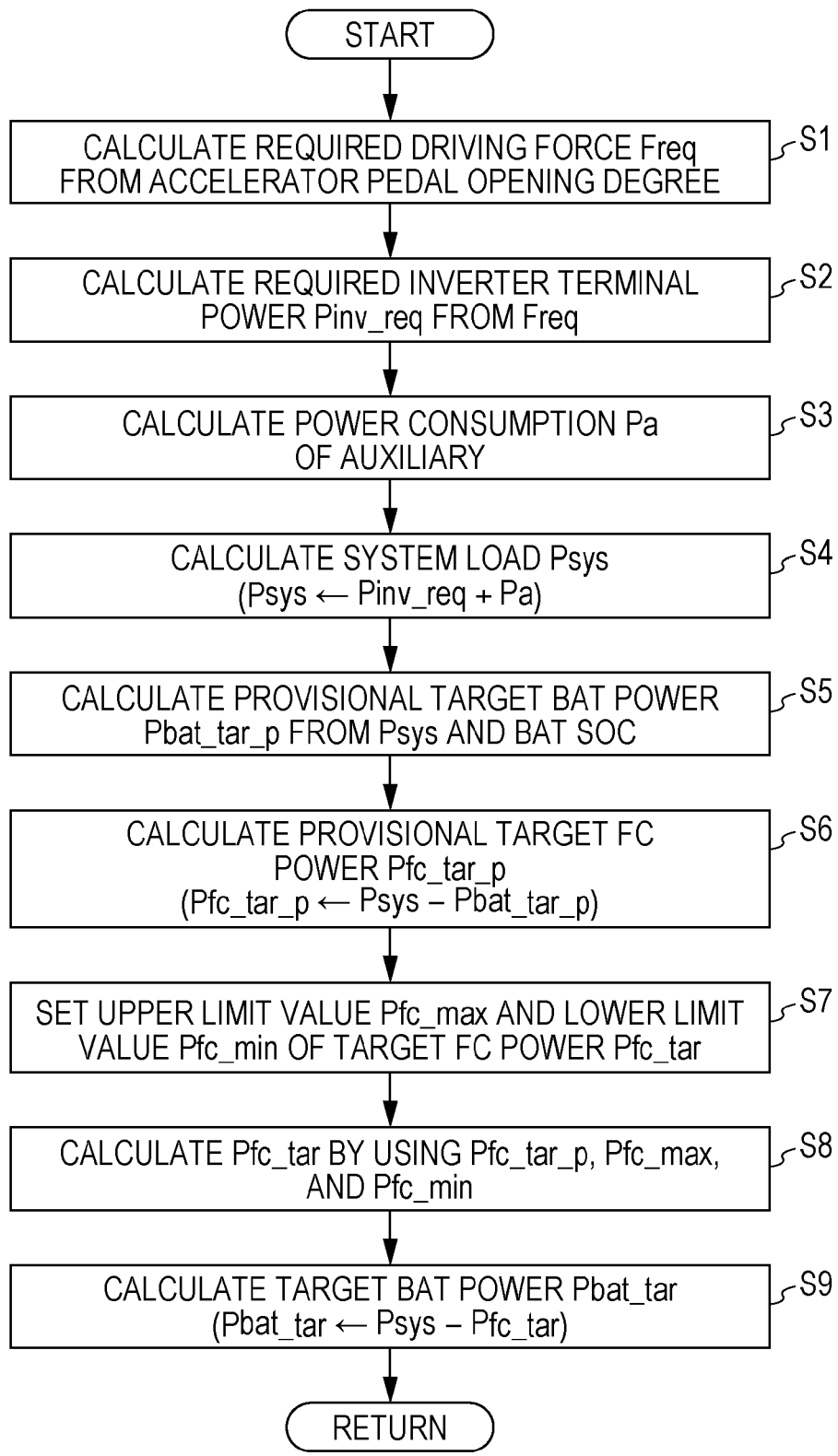
FIG. 4 is a flowchart of a system power control according to the first embodiment.
Figure 5:
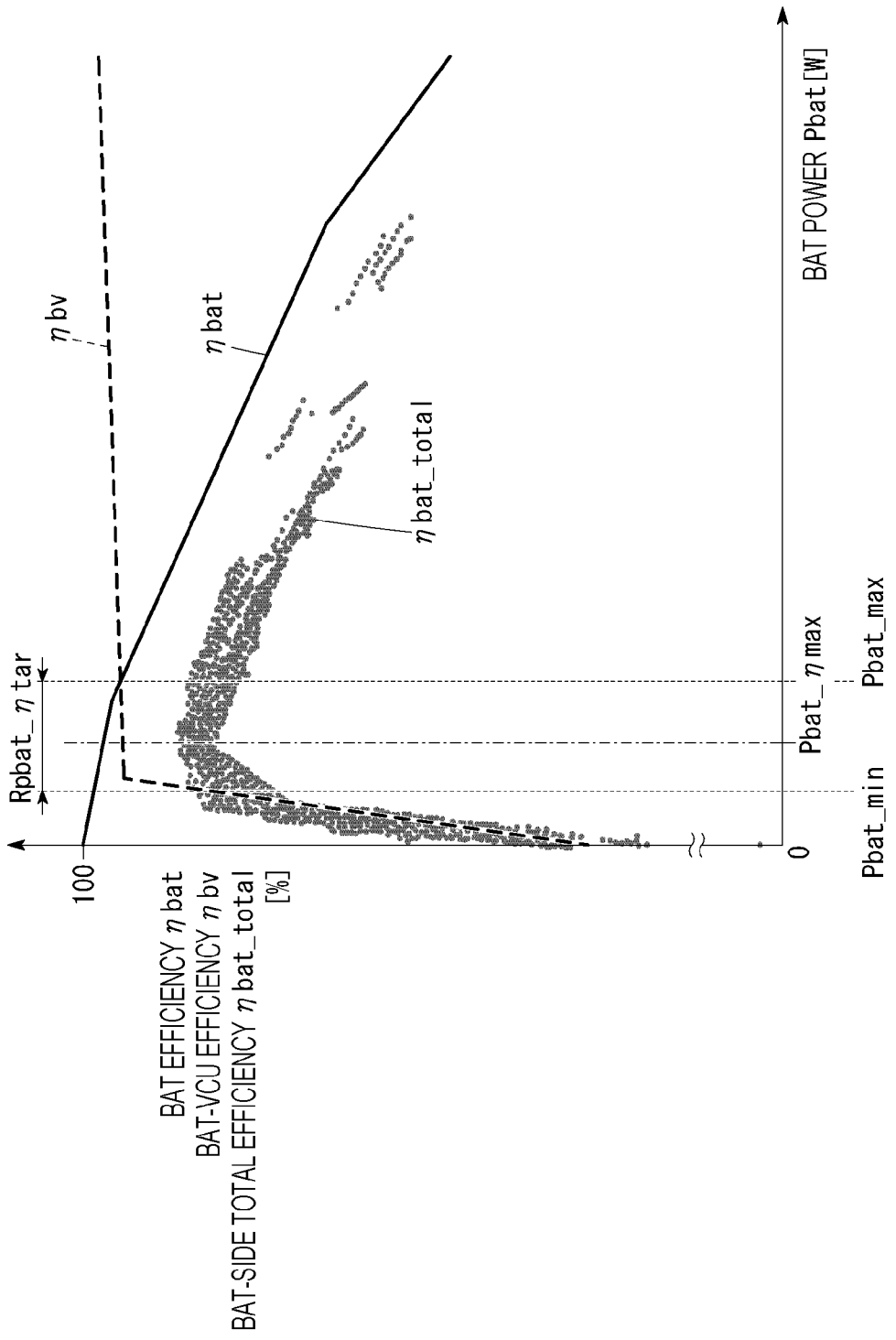
FIG. 5 illustrates a calculation method (S5 of FIG. 4) of a provisional target BAT power according to the first embodiment.

FIG. 4 is a flowchart of a system power control in the first embodiment. In the step S1, the ECU 30 calculates the required driving force Freq of the motor 14 based on the accelerator pedal opening degree θp. In the step S2, the ECU 30 calculates the required inverter terminal power Pinv_req from the required driving force Freq. The required inverter terminal power Pinv_req indicates estimated power consumption of the motor 14. When calculating the required inverter terminal power Pinv_req, the motor revolution Nmot may be used as illustrated in the flowchart of FIG. 5 of Japanese Unexamined Patent Application Publication No. 2014-166103.

In the step S3, the ECU 30 calculates power consumption Pa (hereinafter referred to as "auxiliary power Pa") of the auxiliary 28.

In the step S4, the ECU 30 calculates the system load Psys by adding the required inverter terminal power Pinv_req and the auxiliary power Pa. The system load Psys indicates estimated power consumption of the FC vehicle 10 as a whole.

In the step S5, the ECU 30 calculates provisional target BAT power Pbat_tar_p based on the system load Psys and SOC (BAT SOC) of the battery 22. The provisional target BAT power Pbat_tar_p is a provisional value of the target BAT power Pbat_tar, and a final target BAT power Pbat_tar is calculated in the step S9. A method of calculating the provisional target BAT power Pbat_tar_p is described later with reference to FIG. 5.

In the step S6, the ECU 30 calculates provisional target FC power Pfc_tar_p by subtracting the provisional target BAT power Pbat_tar_p from the system load Psys. The provisional target FC power Pfc_tar_p is a provisional value of the target FC power Pfc_tar, and a final target FC power Pfc_tar is calculated in the step S8.

In the step S7, the ECU 30 sets the upper limit value Pfc_max and the lower limit value Pfc_min of the target FC power Pfc_tar. The upper limit value Pfc_max is an upper limit value which a final target FC power Pfc_tar may have, and the lower limit value Pfc_min is a lower limit value which the final target FC power Pfc_tar may have. In this embodiment, two kinds of the lower limit value Pfc_min (first lower limit value Pfc_min1 and second lower limit value Pfc_min2) are used. A method of setting the upper limit value Pfc_max and lower limit value Pfc_min is described later with reference to FIG. 6.

In the step S8, the target FC power Pfc_tar is calculated by using the provisional target FC power Pfc_tar_p, upper limit value Pfc_max and lower limit value Pfc_min. More specifically, when the provisional target FC power Pfc_tar_p is higher than the upper limit value Pfc_max, the ECU 30 sets the upper limit value Pfc_max as the target FC power Pfc_tar. When the provisional target FC power Pfc_tar_p is lower than the lower limit value Pfc_min, the ECU 30 sets the lower limit value Pfc_min as the target FC power Pfc_tar. When the provisional target FC power Pfc_tar_p is equal to or higher than the lower limit value Pfc_min and equal to or lower than the upper limit value Pfc_max, the ECU 30 sets the provisional target FC power Pfc_tar_p as the target FC power Pfc_tar.

In the step S9, the ECU 30 calculates the target BAT power Pbat_tar by subtracting the target FC power Pfc_tar from the system load Psys. In the first embodiment, the target BAT power Pbat_tar may be negative when the lower limit value Pfc_min is used.

[A-2-2. Method of Calculating Provisional Target BAT Power Pbat_tar_p (S5 of FIG. 4)]

FIG. 5 illustrates a calculation method (S5 of FIG. 4) of the provisional target BAT power Pbat_tar_p in the first embodiment. In FIG. 5, the horizontal axis represents the BAT power Pbat. The vertical axis represents the BAT efficiency $\eta$bat, BAT-VCU efficiency $\eta$bv and BAT-side total efficiency $\eta$bat_total. The BAT efficiency $\eta$bat, BAT-VCU efficiency $\eta$bv and BAT-side total efficiency $\eta$bat_total are described later.

As described above, the provisional target BAT power Pbat_tar_p is calculated based on the system load Psys and SOC of the battery 22. Specifically, when the SOC is lower than the first SOC threshold THsoc1, the provisional target BAT power Pbat_tar_p is set to a relatively small positive fixed value, a negative fixed value or zero in order to charge the battery 22. Alternatively, the provisional target BAT power Pbat_tar_p may be set to a negative fixed value or zero. When the SOC is not lower than the first SOC threshold THsoc1, the provisional target BAT power Pbat_tar_p is set by considering the total efficiency $\eta$bat_total (hereinafter referred to as BAT-side total efficiency $\eta$bat_total) which is the sum of the BAT efficiency Oat and BAT-VCU efficiency $\eta$bv.

The BAT efficiency $\eta$bat is an index (discharge efficiency of the battery 22) indicating how much energy loss (for conversion to heat or the like) may be reduced during discharging of the battery 22. The BAT efficiency $\eta$bat is calculated from the ratio between an energy accumulated in the battery 22 and an energy discharged by the battery 22. As illustrated in FIG. 5 the BAT efficiency $\eta$bat varies according to the BAT power Pbat.

The BAT-VCU efficiency $\eta$bv is an index indicating how much power loss (for conversion to heat or the like) may be reduced during discharging when the BAT-VCU 26 transforms (in this case, boost). The BAT-VCU efficiency $\eta$bv is calculated from the ratio between an input power to the BAT-VCU 26 and the output power from the BAT-VCU 26. FIG. 5 demonstrates that the BAT-VCU efficiency $\eta$bv varies according to the BAT power Pbat.

The total efficiency $\eta$bat_total is a combination of both of the BAT efficiency $\eta$bat and the BAT-VCU efficiency $\eta$bv. In FIG. 5, values of multiple total efficiencies $\eta$bat_total measured by simulation are plotted. As illustrated in FIG. 5, the total efficiency $\eta$bat_total gradually increases while the BAT power Pbat increases from zero to a predetermined value (hereinafter referred to as "maximum efficiency power Pbat_$\eta$max"). When the BAT power Pbat increases beyond the maximum efficiency power Pbat_$\eta$max, the total efficiency $\eta$bat_total gradually decreases.

Therefore, in this embodiment, the provisional target BAT power Pbat_tar_p is set such that the battery 22 discharges when the BAT power Pbat is within a predetermined range (hereinafter referred to as "BAT operation region Rpbat_$\eta$tar"). More specifically, the upper limit value Pbat_max and lower limit value Pbat_min of the BAT operation region Rpbat_$\eta$tar are set to values where the total efficiency $\eta$bat_total is equal to or higher than the first predetermined value TH$\eta$bat_total. Particularly in this embodiment, the BAT power Pbat is controlled so as to be the maximum efficiency power Pbat_$\eta$max.

Specifically, when the system load Psys is lower than the lower limit value Pbat_min of the BAT operation region Rpbat_$\eta$tar, the provisional target BAT power Pbat_tar_p is assumed to be zero. When the system load Psys is higher than the lower limit value Pbat_min and lower than the maximum efficiency power Pbat_$\eta$max, the system load Psys is assumed to be the provisional target BAT power Pbat_tar_p. When the system load Psys is higher than the maximum efficiency power Pbat_$\eta$max, the maximum efficiency power Pbat_$\eta$max is assumed to be the provisional target BAT power Pbat_tar_p whether or not the system load Psys is higher than the upper limit value Pbat_max.

Alternatively, when the system load Psys is higher than the maximum efficiency power Pbat_$\eta$max and equal to or lower than the upper limit value Pbat_max, the system load Psys may be assumed to be the provisional target BAT power Pbat_tar_p. In addition, when the system load Psys is higher than the upper limit value Pbat_max, the upper limit value Pbat_max may be assumed to be the provisional target BAT power Pbat_tar_p.

[A-2-3. Setting of Upper Limit Value Pfc_max and Lower Limit Value Pfc_min of Target FC Power Pfc_tar (S7 of FIG. 4)]

(A-2-3-1. Prerequisite)

Figure 6:
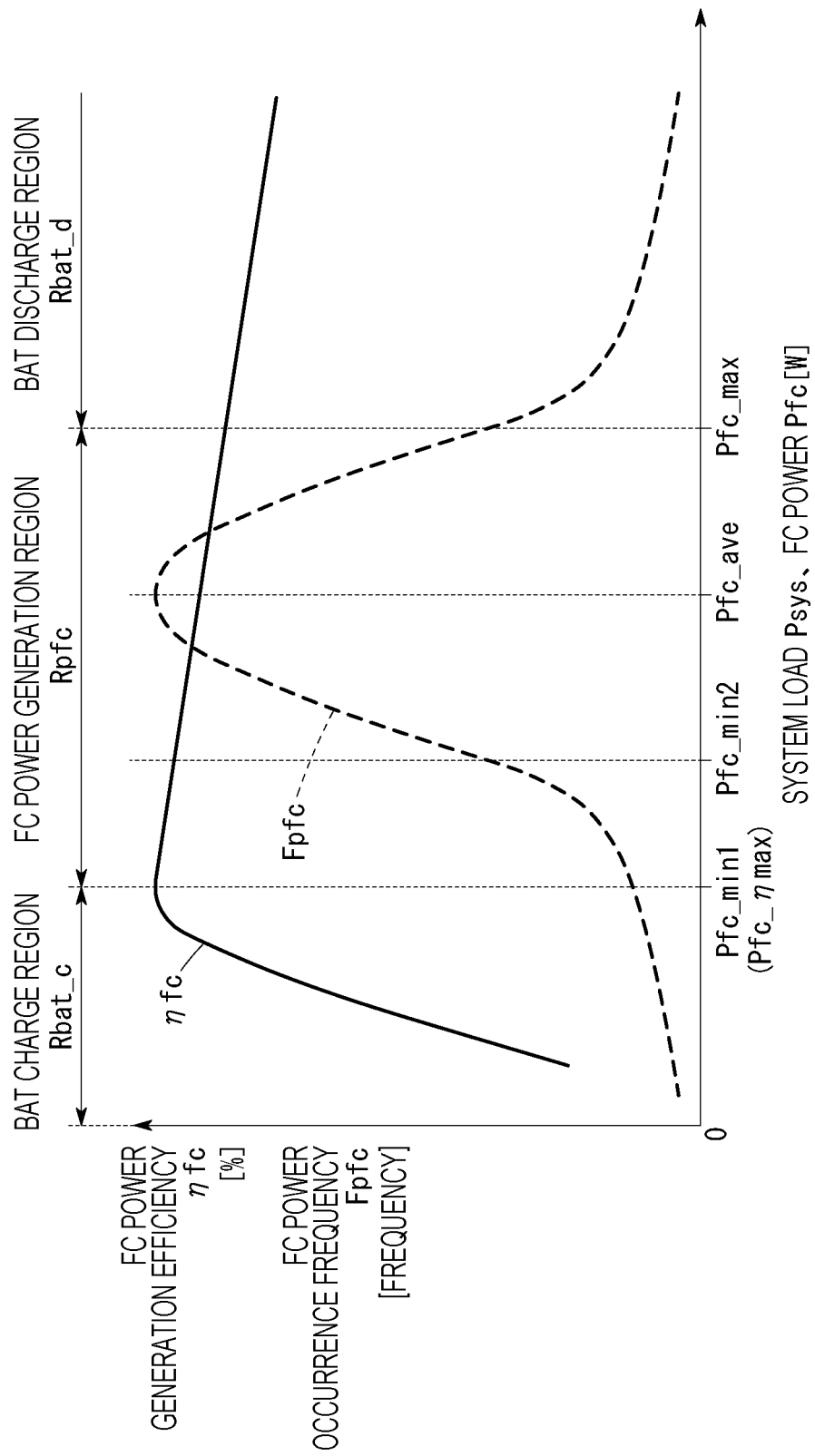
FIG. 6 illustrates a method (S7 of FIG. 4) of setting an upper limit value and a lower limit value of a target FC power according to the first embodiment.

FIG. 6 illustrates a method (S7 of FIG. 4) of setting the upper limit value Pfc_max and lower limit value Pfc_min of the target FC power Pfc_tar in the first embodiment. FIG. 6 illustrates a characteristic indicating the relationship between the FC power Pfc and the FC power generation efficiency $\eta$fc, and a characteristic indicating the relationship between the system load Psys and the FC power occurrence frequency Fpfc.

(A-2-3-2. FC Power Generation Efficiency ηfc)

The FC power generation efficiency ηfc is an index indicating how much energy loss (for conversion to heat or the like) may be reduced during power generation by the FC 50. The FC power generation efficiency ηfc is calculated from the ratio between an energy supplied to the FC 50 (amount of fuel gas/oxidizing agent gas) and an energy generated by the FC 50 (FC power Pfc).

As illustrated in FIG. 6, the FC power generation efficiency ηfc varies according to the FC power Pfc. More specifically, when the FC power Pfc increases from zero to a predetermined value (hereinafter referred to as "maximum efficiency power Pfc_ηmax"), the FC power generation efficiency ηfc increases gradually. When the FC power Pfc increases beyond the maximum efficiency power Pfc_ηmax, the FC power generation efficiency ηfc gradually decreases.

(A-2-3-3. FC Power Occurrence Frequency Fpfc)

FC power occurrence frequency Fpfc (hereinafter referred to as "occurrence frequency Fpfc") is a normalized frequency value (value as normal distribution) of the FC power Pfc when the vehicle 10 is traveled by simulation or in practice. In the example of FIG. 6, when the FC power Pfc is a predetermined value (hereinafter referred to as "average value Pfc_ave"), the occurrence frequency becomes maximum.

(A-2-3-4. Upper Limit Value Pfc_max and Lower Limit Value Pfc_min of Provisional Target FC Power Pfc_tar_p)

In this embodiment, the FC power Pfc (maximum efficiency power Pfc_ηmax) which maximizes the FC power generation efficiency ηfc is assumed as the first lower limit value Pfc_min1. Alternatively, a value close to the maximum efficiency power Pfc_ηmax may be assumed as the first lower limit value Pfc_min1.

An upper limit value in a specific range about the average value Pfc_ave of the occurrence frequency Fpfc is assumed to be the upper limit value Pfc_max, and a lower limit value in the specific range is assumed to be the second lower limit value Pfc_min2 (Pfc_max−Pfc_ave=Pfc_ave−Pfc_min2). Thus, the upper limit value Pfc_max may determine whether the FC power generation efficiency ηfc is equal to or lower than the power generation efficiency threshold THpfc_η (second predetermined value).

Normally (more specifically, when BAT SOC is equal to or higher than the second SOC threshold THsoc2), the ECU 30 uses the first lower limit value Pfc_min1. On the other hand, when the BAT SOC is not equal to or higher than the second SOC threshold THsoc2, the ECU 22 uses the second lower limit value Pfc_min2 in order to prevent overcharge of the battery 22.

For this reason, when the first lower limit value Pfc_min1 is used, a region between the first lower limit value Pfc_min1 and the upper limit value Pfc_max becomes the power generation region Rpfc (hereinafter referred to as "FC power generation region Rpfc") of the FC 50. When the second lower limit value Pfc_min2 is used, a region between the second lower limit value Pfc_min2 and the upper limit value Pfc_max becomes the FC power generation region Rpfc.

As described in the step S8 of FIG. 4, in this embodiment, when the provisional target FC power Pfc_tar_p is higher than the upper limit value Pfc_max, the upper limit value Pfc_max is set as the target FC power Pfc_tar. In this case, the difference between the system load Psys and the upper limit value Pfc_max is discharged by the battery 22 (see BAT discharge region Rbat_d of FIG. 6). In the same manner, when the provisional target FC power Pfc_tar_p is lower than the lower limit value Pfc_min, the lower limit value Pfc_min is set as the target FC power Pfc_tar. In this case, the difference between the lower limit value Pfc_min and the system load Psys is charged by the battery 22 (see BAT charge region Rbat_c of FIG. 6).

[A-2-4. Use of Target FC Power Pfc_tar and Target BAT Power Pbat_tar]

After the target FC power Pfc_tar and the target BAT power Pbat_tar are calculated according to the flowchart of FIG. 4, the ECU 30 controls respective parts of the system 12 by using the target FC power Pfc_tar and the target BAT power Pbat_tar.

Specifically, the ECU 30 controls the boosting rate of the FC converter 24 such that actually generated power of the FC 50 (FC power Pfc) matches the target FC power Pfc_tar. Also, the ECU 30 controls the boosting rate of the battery converter 26 such that actual I/O power Pbat of the battery 22 matches the target BAT power Pbat_tar. When the target BAT power Pbat_tar is a negative value, the ECU 30 keeps the switching element 94 in the on state to put the BAT-VCU 26 in the directly coupled state.

[A-2-5. Example of System Power Control]

Figure 7:
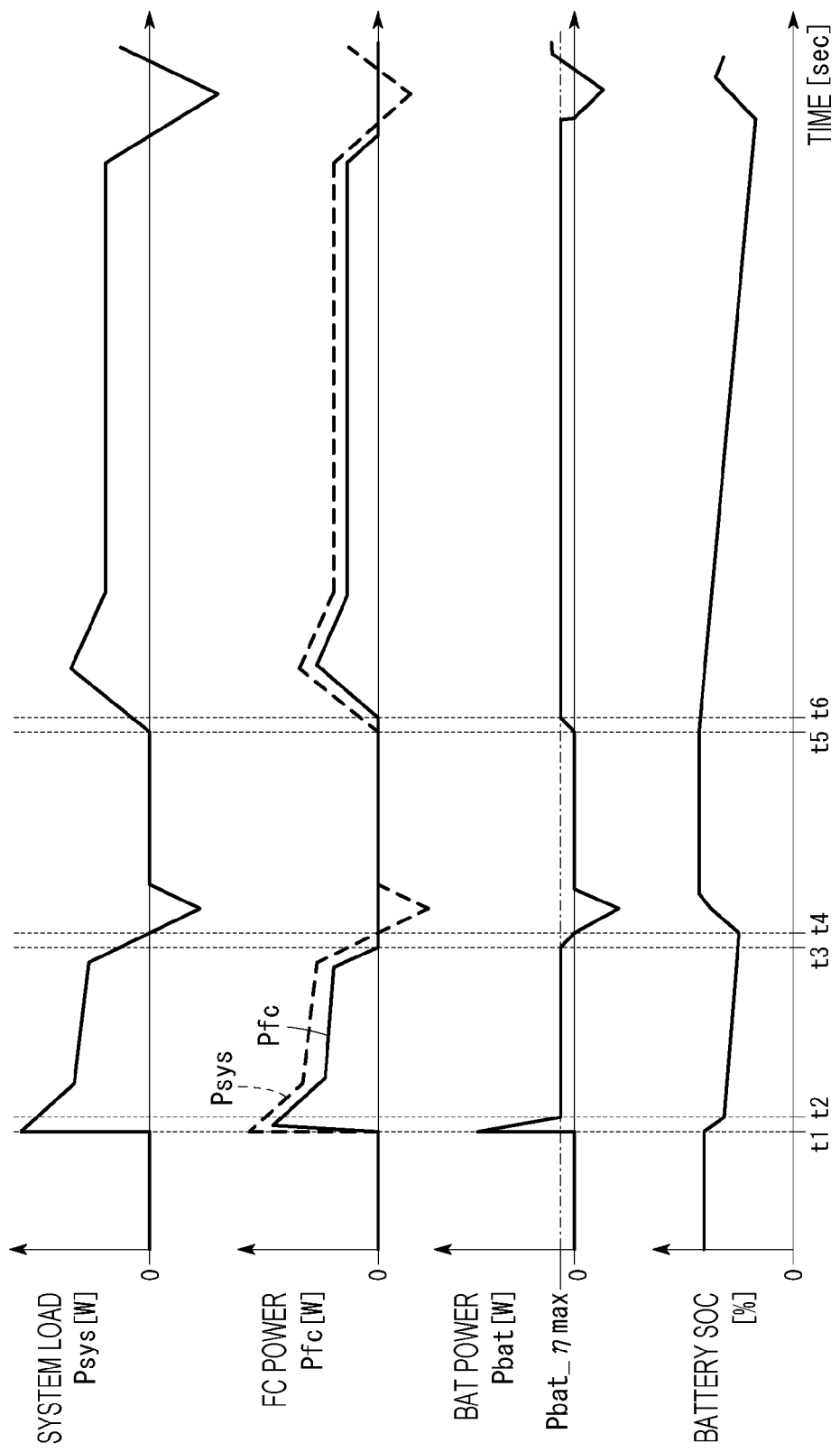
FIG. 7 is a time chart illustrating an example of the system load, FC power, BAT power and battery SOC when system power control according to the first embodiment is used.

FIG. 7 is a time chart illustrating an example of the system load Psys, FC power Pfc, BAT power Pbat and battery SOC when the system power control according to the first embodiment is used. At the time t1 of FIG. 7, when the system load Psys increases sharply, the FC power Pfc and the BAT power Pbat also increase sharply. In other words, the FC power Pfc increases up to the upper limit value Pfc_max (FIG. 6) (S8 of FIG. 4), and the BAT power Pbat becomes a value which compensates for the difference between the system load Psys and the upper limit value Pfc_max (S9).

At the time t2, the system load Psys decreases down to the total value of the upper limit value Pfc_max of the FC power Pfc and the maximum efficiency power Pbat_ηmax of the BAT power Pbat. From the time t2 to the time t3, the system load Psys decreases. During this period, the BAT power Pbat maintains the maximum efficiency power Pbat_ηmax (FIG. 5) (S5, S9 of FIG. 4), while the FC power Pfc varies according to the difference between the system load Psys and the maximum efficiency power Pbat_ηmax (S6, S8).

At the time t3, the system load Psys decreases down to the maximum efficiency power Pbat_ηmax of the BAT power Pbat. At that time, the FC power Pfc becomes zero. When the system load Psys further decreases during the period from the time t3 to the time t4, the BAT power Pbat decreases along with the system load Psys.

During the period from the time t4 to the time t5, the system load Psys is equal to or lower than zero. During this period, the FC power Pfc is zero. The BAT power Pbat varies according to the system load Psys. When the system load Psys is a negative value, the battery 22 is charged.

At the time t5, when the system load Psys starts to increase from zero, the BAT power Pbat increases along with this. Then, at the time t6, the system load Psys and the BAT power Pbat reach the maximum efficiency power Pbat_ηmax. Then, after the time t6, the FC power Pfc varies according to the difference between the system load Psys and the maximum efficiency power Pbat_ηmax.

<A-3. Effects of First Embodiment>

As described above, according to the first embodiment, the provisional target BAT power Pbat_tar_p (the storage device shared power) is set such that the BAT-side total efficiency ηbat_total in the power supply path (FIG. 1) from the battery 22 (storage device) to the load 40 becomes maximum (becomes equal to or higher than the first predetermined value) (S5 of FIG. 4, FIGS. 5 and 7). Also, power corresponding to the difference determined by subtracting the provisional target BAT power Pbat_tar_p from the system load Psys (required system power) is set as the provisional target FC power Pfc_tar_p (fuel battery shared power) (S6 of FIG. 4, FIGS. 6 and 7). Thus, when the BAT-side total efficiency ηbat_total significantly influences power efficiency of the system 12 as a whole, power efficiency or energy efficiency of the entire system 12 may be improved.

In the first embodiment, the FC system 12 (power supply system) is coupled in between the battery 22 (storage device) and the load 40 and includes a BAT-VCU 26 (voltage converter) configured to transform the battery voltage Vbat (FIG. 1). The ECU 30 (controller) sets the provisional target BAT power Pbat_tar_p (the storage device shared power) such that the BAT-side total efficiency ηbat_total (power efficiency) by combination of the battery 22 and the BAT-VCU 26 becomes maximum value (becomes equal to or higher than the first predetermined value) (S5 of FIG. 4, FIGS. 5 and 7). Thus, when the BAT-side total efficiency ηbat_total by combination of the battery 22 and the BAT-VCU 26 significantly influences power efficiency of the system 12 as a whole, power efficiency or energy efficiency of the entire system 12 may be improved.

In the first embodiment, the ECU 30 (controller) sets the upper limit value Pfc_max (power upper limit value) which is the FC power Pfc for determining whether the FC power generation efficiency ηfc becomes equal to or lower than the power generation efficiency threshold THpfc_η (second predetermined value) (S7 of FIG. 4, FIG. 6). When the provisional target FC power Pfc_tar_p (fuel battery shared power) is higher than the upper limit value Pfc_max, the ECU 30 sets the upper limit value Pfc_max as the target FC power Pfc_tar (S8 of FIG. 4). In addition, the ECU 30 sets a power corresponding to the difference determined by subtracting the upper limit value Pfc_max from the system load Psys (required system power) as the target BAT power Pbat_tar (S9 of FIG. 4).

Thus, when the provisional target FC power Pfc_tar_p is higher than the upper limit value Pfc_max, power efficiency or energy efficiency of the system 12 as a whole may be further improved by considering the FC 50 side efficiency (FC power generation efficiency ηfc) as well as the BAT-side total efficiency ηbat_total.

In the first embodiment, the ECU 30 (controller) sets the lower limit value Pfc_min (power lower limit value) which is the FC power Pfc for determining whether the FC power generation efficiency ηfc becomes equal to or lower than the maximum efficiency power Pfc_ηmax (third predetermined value) (S7 of FIG. 4, FIG. 6). When the provisional target FC power Pfc_tar_p (fuel cell shared power) is lower than the lower limit value Pfc_min, the ECU 30 sets the lower limit value Pfc_min as the target FC power Pfc_tar (S8 of FIG. 4). In addition, the ECU 30 sets a power corresponding to the difference determined by subtracting the lower limit value Pfc_min from the system load Psys (required system power) as the target BAT power Pbat_tar (S9 of FIG. 4).

Thus, when the provisional target FC power Pfc_tar_p is lower than the lower limit value Pfc_min, power efficiency or energy efficiency of the system 12 as a whole may be further improved by considering the FC 50 side efficiency (FC power generation efficiency ηfc) as well as the BAT-side total efficiency ηbat_total.

In the first embodiment, when SOC of the battery 22 (storage device) is lower than the second SOC threshold THsoc (remaining capacity threshold), the ECU 30 (controller) sets the power lower limit value Pfc_min (Pfc_min1) to a value equal to or lower than the maximum efficiency power Pfc_ηmax which maximizes the FC efficiency ηfc (S7 of FIG. 4, FIG. 6). When SOC is higher than the second SOC threshold THsoc, the ECU 30 sets the power lower limit value Pfc_min (Pfc_min2) to a value higher than the maximum efficiency power Pfc_ηmax (S7 of FIG. 4, FIG. 6). In other words, the lower limit value Pfc_min of the FC power generation efficiency ηfc is increased such that the FC power generation efficiency ηfc does not become the maximum value. Thus, when the battery 22 may be excessively charged due to the SOC higher than the second SOC threshold THsoc2, the battery 22 may be protected by reducing the FC efficiency ηfc, and surplus power in the system 12 as a whole may be reduced.

B. Second Embodiment

<B-1. Configuration>

Hardware configuration of the second embodiment is basically the same as the first embodiment. However, the upper limit value Vbat_max of the utilization voltage range Rvbat (hereinafter also referred to as "BAT voltage range Rvbat") of the battery 22 according to the second embodiment is set to a value higher than the lower limit value Vmot_req_min in the range of the required voltage Vmot_req. This is because the battery voltage Vbat is made equal to or higher than the required motor voltage Vmot_req even when the BAT-VCU 26 is in the directly coupled state. Thus, the directly coupled state of the BAT-VCU 26 may be utilized more frequently than in the first embodiment. Further, the lower limit value Pbat_min of the BAT voltage range Rvbat is higher than the upper limit value Vfc_max of the FC 50 utilization voltage range Rvfc (hereinafter referred to as "FC voltage range Rvfc").

When the passing power Pfv is the same, the switching element 72 (FIG. 2) of the FC-VCU 24 according to the second embodiment has higher power conversion efficiency than switching elements 92, 94 (FIG. 3) of the BAT-VCU 26 (in other words, less power loss). Thus, when combined with increasing of utilization frequency of the directly coupled state of the BAT-VCU 26, power efficiency of the FC system 12 as a whole may be improved.

The switching element 72 (first switching element) of the second embodiment includes, for example, the MOSFET (metal-oxide-semiconductor field-effect transistor). The MOSFET constituting the switching element 72 is, for example, made of SiC (silicon carbide). Switching elements 92, 94 (second switching elements) according to the second embodiment include, for example, the IGBT. The IGBT constituting the switching elements 92, 94 is, for example, made of silicon.

<B-2. Control of Second Embodiment>

Figure 8:
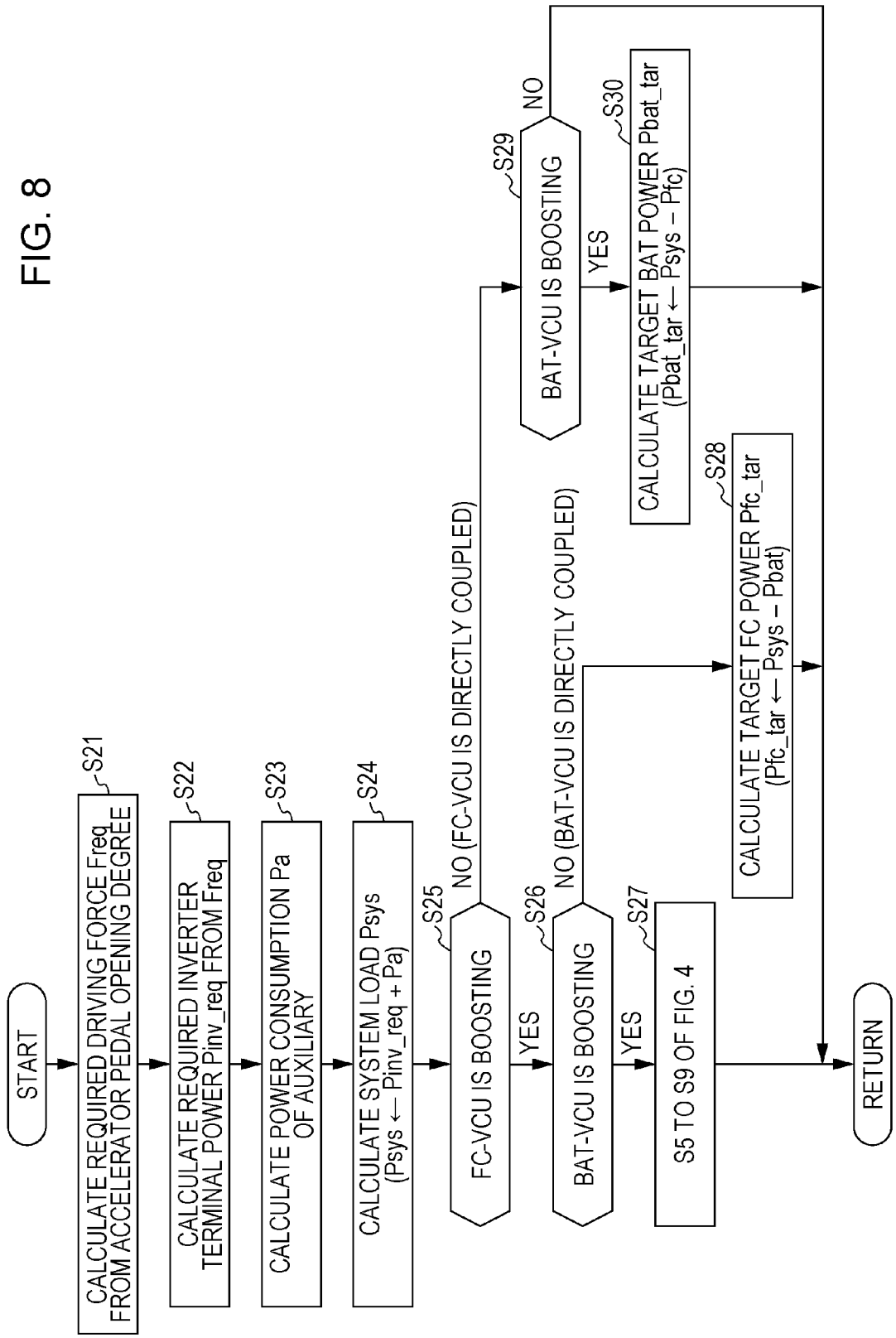
FIG. 8 is a flowchart of a system power control according to a second embodiment.

Next, a system power control which controls output of the FC 50 and battery 22 in the second embodiment is described. FIG. 8 is a flowchart of a system power control in the second embodiment. Steps S21 to S24 are the same as steps S1 to S4 of FIG. 4.

In the step S25, the ECU 30 determines whether the FC-VCU 24 is boosting. If the FC-VCU 24 is boosting (S25: YES), in the step S26, the ECU 30 determines whether the BAT-VCU 26 is boosting. If the BAT-VCU 26 is boosting (S26: YES), in the step S27, the ECU 30 performs the same processing as in steps S5 to S9 of FIG. 4.

If the BAT-VCU 26 is not boosting (S26: NO), only the BAT-VCU 26 is in the directly coupled state. In this case, in the step S28, the ECU 30 sets a value determined by subtracting the BAT power Pbat from the system load Psys as the target FC power Pfc_tar.

Back to the step S25, if the FC-VCU 24 is not boosting (S25: NO), in the step S29, the ECU 30 determines whether the BAT-VCU 26 is boosting. If the BAT-VCU 26 is not boosting (S29: YES), only the FC-VCU 24 is in the directly coupled state. In this case, in the step S30, the ECU 30 sets a value determined by subtracting the FC power Pfc from the system load Psys as the target BAT power Pbat_tar.

If the BAT-VCU 26 is not boosting in the step S29 (S29: NO), both the FC-VCU 24 and the BAT-VCU 26 are in the directly coupled state. This state happens when the motor 14 is in the stopped state or in the regenerating state and the system load Psys is very small. In this case, the ECU 30 restricts power generation of the FC 50. The auxiliary power Pa is covered by the regenerative power Preg or the BAT power Pbat.

<B-3. Effects of Second Embodiment>

According to the second embodiment described above, the following effects are provided in addition to or in place of the effects of the first embodiment.

More specifically according to the second embodiment, the target FC power Pfc_tar and the target BAT power Pbat may be suitably set even in the configuration where the FC-VCU 26 and the BAT-VCU 26 are switched to the directly coupled state and boosting operation.

C. Modified Example

The present disclosure may adopt various configurations based on the specification described herein but not limited to the above embodiment. For example, the following configurations may be adopted.

<C-1. Mounted System>

In the above embodiments, the FC system 12 is mounted in the FC vehicle 10 (FIG. 1). However, it is not limited thereto, for example, from the viewpoint that a power corresponding to the difference determined by subtracting the target BAT power Pbat_tar (or provisional target BAT power Pbat_tar_p) from the system load Psys from the system load Psys is set as the target FC power Pfc_tar (or provisional target FC power Pfc_tar_p). For example, the FC system 12 may be used for a moving object such as the vessel and aircraft. Alternatively, the FC system 12 may be applied to robots, manufacturing apparatuses, home power systems or household electric products.

<C-2. Configuration of FC System 12>

In the above embodiments, the step-up converter 24 is disposed upstream of the FC 50 (FIG. 1). However, it is not limited thereto, for example, from the viewpoint that a power corresponding to the difference determined by subtracting the target BAT power Pbat_tar from the system load Psys is set as the target FC power Pfc_tar. For example, in place of the step-up converter 24, a step-up/step-down converter capable of stepping up and down the FC voltage Vfc or a step-down converter capable of stepping down the FC voltage may be disposed.

In the above embodiments, the step-up converter 26 is disposed upstream of the battery 22 (FIG. 1). However, it is not limited thereto, for example, from the viewpoint that a power corresponding to the difference determined by subtracting the target BAT power Pbat_tar from the system load Psys is set as the target FC power Pfc_tar. For example, in place of the step-up converter 26, a step-up/step-down converter capable of stepping up the BAT voltage Vbat and stepping down the regenerative voltage Vreg or the FC voltage Vfc may be used. Alternatively, a step-up converter capable of stepping up the BAT voltage Vbat and stepping up the regenerative voltage Vreg or the FC voltage Vfc may be used.

Also, one of the step-up converter 24 upstream of the FC 50 and the step-up converter 26 upstream of the battery 22 may be omitted. For example, in the case where the step-up converter 26 upstream of the battery 22 is omitted, the provisional target BAT power Pbat_tar_p (storage device shared power) may be set, for example, in the range of 0 to α (W) such that the BAT efficiency ηbat is equal to or higher than a predetermined value.

In the above embodiments, the motor 14 is of the AC type (FIG. 1). However, it is not limited thereto, for example, from the viewpoint that a power corresponding to the difference determined by subtracting the target BAT power Pbat_tar from the system load Psys is set as the target FC power Pfc_tar. For example, the motor 14 may be of the DC type. In this case, the inverter 16 may be omitted.

In the above embodiments, the motor 14 is used for traveling or driving the vehicle 10. However, it is not limited thereto, for example, from the viewpoint that a power corresponding to the difference determined by subtracting the target BAT power Pbat_tar from the system load Psys is set as the target FC power Pfc_tar. For example, the motor 14 may be used for vehicle-mounted devices (for example, electric power steering, air compressor, and air conditioner).

<C-3. Control of FC System 12>

[C-3-1. System Load Psys]

In the first embodiment, the system load Psys is calculated based on the required inverter terminal power Pinv_req and the auxiliary power Pa (S4 of FIG. 4). However, the system load Psys may be calculated from only one out of the required inverter terminal power Pinv_req and the auxiliary power Pa. Alternatively, in the case where the FC system 12 is applied to a configuration other than the vehicle 10, the system load Psys (required system power) may be constituted by another load.

[C-3-2. Target BAT Power Pbat_tar]

In the first embodiment, when the system load Psys is higher than the maximum efficiency power Pbat_ηmax, the maximum efficiency power Pbat_ηmax (BAT power Pbat corresponding to the BAT-side total efficiency ηbat_total) is set as the provisional target BAT power Pbat_tar_p (S5 of FIG. 4). However, it is not limited thereto from the viewpoint that the target BAT power Pbat_tar is set such that the total efficiency ηbat_total becomes equal to or higher than the first predetermined value THηbat_total. For example, when the system load Psys is within the BAT operation region Rpbat_ηtar, the system load Psys may be used, as is, as the provisional target BAT power Pbat_tar_p. The same also applies to the second embodiment (S27 of FIG. 8).

[C-3-3. Upper Limit Value Pfc_max and Lower Limit Value Pfc_min of Target FC Power Pfc_tar]

In the first embodiment, after the target FC power Pfc_tar is calculated by using the upper limit value Pfc_max and the lower limit value Pfc_min (S8 of FIG. 4), the difference between the system load Psys and the target FC power Pfc_tar is compensated with the target BAT power Pbat_tar (S9). However, one or both of the upper limit value Pfc_max and the lower limit value Pfc_min may be omitted, for example, from the viewpoint that a power corresponding to the difference determined by subtracting the target BAT power Pbat_tar from the system load Psys is set as the target FC power Pfc_tar. The same also applies to the second embodiment (S27 of FIG. 8).

In the first embodiment, the upper limit value Pfc_max and the second lower limit value Pfc_min2 are set by using the FC power occurrence frequency Fpfc (FIG. 6). Also, in the first embodiment, the first lower limit value Pfc_min1 is set by using the FC power generation efficiency ηfc (FIG. 6). However, it is not limited thereto from the viewpoint that the target FC power Pfc_tar is restricted by considering characteristics of the FC 50 (FC power generation efficiency ηfc and so on). For example, the target FC power Pfc_tar also may be restricted based on the FC voltage Vfc by considering that deterioration degree of the FC 50 varies according to the FC voltage Vfc (more specifically, one or both of the upper limit value Pfc_max and the lower limit value Pfc_min may be set based on the FC voltage Vfc). The same also applies to the second embodiment (S27 of FIG. 8).

According to the present disclosure, a fuel cell and a storage device that are capable of supplying power to a load; and a controller configured to control operations of the fuel cell and the storage device, in which when allocating required system power being a required power of the power supply system as a whole to a fuel cell shared power covered by the fuel cell and a storage device shared power covered by the storage device, the controller sets the storage device shared power such that power efficiency in a power supply path from the storage device to the load becomes equal to or higher than a first predetermined value, and sets a power that is a difference determined by subtracting the storage device shared power from the required system power as the fuel cell shared power.

According to the present disclosure, storage device shared power is set such that power efficiency in a power supply path from the storage device to the load becomes equal to or higher than a first predetermined value, and a power that is a difference determined by subtracting the storage device shared power from the required system power is set as the fuel cell shared power. Thus, when power efficiency in the power supply path from the storage device to the load significantly influences power efficiency of the entire power supply system, power efficiency or energy efficiency of the entire power supply system may be improved.

The power supply system may further include a voltage converter that is connected between the storage device and the load and configured to transform output voltage of the storage device. The controller may set the storage device shared power such that the power efficiency by combination of the storage device and the voltage converter becomes equal to or higher than the first predetermined value. With this configuration, when power efficiency by combination of the storage device and the voltage converter significantly influences power efficiency of the entire power supply system, power efficiency or energy efficiency of the entire power supply system may be improved.

The controller may set a power upper limit value that is power generated by the fuel cell for determining whether the power efficiency of the fuel cell becomes equal to or lower than a second predetermined value. In addition, when the fuel cell shared power is higher than the power upper limit value, the controller may set the power upper limit value as the fuel cell shared power and set a power that is a difference determined by subtracting the power upper limit value from the required system power as the storage device shared power.

Thus, when power generated by the fuel cell is higher than the power upper limit value, power efficiency or energy efficiency of the entire power supply system may be further improved by considering efficiency of the fuel cell as well as power efficiency by combination of the storage device and a second voltage converter.

The controller may set a power lower limit value that is power generated by the fuel cell for determining whether the power efficiency of the fuel cell becomes equal to or lower than a third predetermined value. In addition, when the fuel cell shared power is lower than the power lower limit value, the controller may set the power lower limit value as the fuel cell shared power and set a power that is a difference determined by subtracting the power lower limit value from the required system power as the storage device shared power.

Thus, when power generated by the fuel cell is lower than the power lower limit value, power efficiency or energy efficiency of the entire power supply system may be further improved by also considering efficiency on the side of the fuel cell as well as power efficiency by combination of the storage device and the second voltage converter.

When a remaining capacity of the storage device is lower than a remaining capacity threshold, the controller may set the power lower limit value to a value equal to or lower than a maximum efficiency power which is a power generated by the fuel cell and with which the power generation efficiency of the fuel cell becomes maximum. In addition, when the remaining capacity is higher than the remaining capacity threshold, the controller may set the power lower limit value to a value higher than the maximum efficiency power. Thus, when the storage device may be overcharged since the remaining capacity is higher than the remaining capacity threshold, the storage device may be protected by reducing power generation efficiency of the fuel cell, and surplus power in the power supply system as a whole may be reduced.

According to the present disclosure, energy efficiency or power efficiency as a whole may be improved.

Obviously, numerous modifications and variations of the present invention are possible in light of the above teachings. It is therefore to be understood that within the scope of the appended claims, the invention may be practiced otherwise than as specifically described herein.

What is claimed is:
1. A power supply system comprising:
a fuel cell and a power storage to supply electric power to a load;
a processor configured to
control the fuel cell and the power storage;
acquire a required system power that is required in the power supply system;
determine a power storage shared power of the power storage such that power efficiency of the power storage shared power supplied from the power storage to the load is equal to or higher than a first value; and
determine a fuel cell shared power of the fuel cell such that the fuel cell shared power supplied from the fuel cell is a difference between the power storage shared power and the required system power
a first voltage converter connected between the fuel cell and the load to transform output voltage of the fuel cell; and
a second voltage converter connected between the power storage and the load to transform output voltage of the power storage,
wherein the processor is configured to
control the first voltage converter such that power generated in the fuel cell matches the fuel cell shared power, and control the second voltage converter such that power generated in the power storage matches the power storage shared power.

2. The power supply system according to claim 1, wherein the processor sets the power storage shared power such that the power efficiency by combination of the power storage and the second voltage converter becomes equal to or higher than the first value.

3. The power supply system according to claim 1, wherein the processor:
   sets a power upper limit value that is power generated by the fuel cell for determining whether the power efficiency of the fuel cell becomes equal to or lower than a second value; and
   when the fuel cell shared power is higher than the power upper limit value, sets the power upper limit value as the fuel cell shared power and sets a power that is a difference determined by subtracting the power upper limit value from the required system power as the power storage shared power.

4. The power supply system according to claim 1, wherein the processor:
   sets a power lower limit value that is power generated by the fuel cell for determining whether the power efficiency of the fuel cell becomes equal to or lower than a third value; and
   when the fuel cell shared power is lower than the power lower limit value, sets the power lower limit value as the fuel cell shared power and sets a power that is a difference determined by subtracting the power lower limit value from the required system power as the power storage shared power.

5. The power supply system according to claim 4, wherein
   when a remaining capacity of the power storage is lower than a remaining capacity threshold, the processor sets the power lower limit value to a value equal to or lower than a maximum efficiency power which is a power generated by the fuel cell and with which the power generation efficiency of the fuel cell becomes maximum, and
   when the remaining capacity is higher than the remaining capacity threshold, the processor sets the power lower limit value to a value higher than the maximum efficiency power.

6. The power supply system according to claim 1, wherein the power efficiency corresponds to power efficiency of a power supply path via which the electric power is supplied from the power storage to the load.

7. A power supply system comprising:
   a fuel cell and a power storage to supply electric power to a load; and
   a processor configured to
      control the fuel cell and the power storage;
      acquire a required system power that is required in the power supply system;
      determine a power storage shared power such that power efficiency of the electric power supplied from the power storage to the load is equal to or higher than a first value; and
      determine a fuel cell shared power such that the electric power supplied from the fuel cell is a difference between the power storage shared power and the required system power, wherein
   the processor:
      sets a power lower limit value that is power generated by the fuel cell for determining whether the power efficiency of the fuel cell becomes equal to or lower than a third value; and
      when the fuel cell shared power is lower than the power lower limit value, sets the power lower limit value as the fuel cell shared power and sets a power that is a difference determined by subtracting the power lower limit value from the required system power as the power storage shared power.

8. The power supply system according to claim 7, wherein
   when a remaining capacity of the power storage is lower than a remaining capacity threshold, the processor sets the power lower limit value to a value equal to or lower than a maximum efficiency power which is a power generated by the fuel cell and with which the power generation efficiency of the fuel cell becomes maximum, and
   when the remaining capacity is higher than the remaining capacity threshold, the processor sets the power lower limit value to a value higher than the maximum efficiency power.

* * * * *